United States Patent [19]

Goldinger

[11] Patent Number: 4,671,155
[45] Date of Patent: Jun. 9, 1987

[54] POSITIONING APPARATUS

[75] Inventor: John A. Goldinger, Boiling Springs, Pa.

[73] Assignee: PPG Industries, Inc., Pittsburgh, Pa.

[21] Appl. No.: 744,182

[22] Filed: Jun. 13, 1985

[51] Int. Cl.$^4$ .......................... B26D 3/08; C03B 33/02
[52] U.S. Cl. ..................................... 83/886; 83/425.2; 83/499; 83/508.2; 83/861
[58] Field of Search ...................... 83/425.2, 498, 499, 83/508.2, 508.3, 603, 861, 879–886; 225/96, 96.5

[56] References Cited

U.S. PATENT DOCUMENTS

| 336,304 | 2/1886 | Ellis | 83/267 |
|---|---|---|---|
| 1,157,649 | 10/1915 | Templeton | 83/267 |
| 4,171,657 | 10/1979 | Halberschmidt et al. | 83/886 |
| 4,210,052 | 7/1980 | Fisher | 83/886 |

FOREIGN PATENT DOCUMENTS

| 729291 | 7/1932 | France | 83/603 |
|---|---|---|---|
| 334395 | 9/1930 | United Kingdom | 83/603 |
| 2032418 | 5/1980 | United Kingdom | 83/886 |

Primary Examiner—E. R. Kazenske
Assistant Examiner—Hien H. Phan
Attorney, Agent, or Firm—Donald Carl Lepiane; Robert A. Westerlund, Jr.

[57] ABSTRACT

A positioning or displacement apparatus includes a first member having a first engaging facility and a second member having a plurality of second engaging facilities, wherein the first and second members are relatively movable between a first position wherein a first selected one of the second engaging facilities is engaged with the first engaging facility. The second member is preferably linearly displaceable by disengaging the first selected one of the second engaging facilities, and then engaging a second selected one of the second engaging facilities with the first engaging facility.

11 Claims, 5 Drawing Figures 4,671,155

POSITIONING APPARATUS

FIELD OF THE INVENTION

The present invention relates to an indexing or positioning apparatus, e.g. for positioning a carriage(s) along a bridge which extends across a work surface.

TECHNOLOGICAL ENVIRONMENT OF THE INVENTION

There are presently available many types of apparatus for indexing or positioning a tool, device, member, or other object, e.g. a tool carrier unit, along a linear movement path. For example, U.S. Pat. Nos. 3,834,258 and 4,170,159 and U.S. patent application Ser. No. 732,040, entitled "CARRIAGE TRAIN PRECISION LINEAR POSITIONING SYSTEM," and filed on May 9, 1985 in the name of Dwight A. Bollinger et al., teach the use of a ball screw drive mechanism for positioning a plurality of tool carrier units, e.g. glass cutter head assemblies/carriages, along a bridge extending across or over a work surface, e.g. a glass conveyor, in conjunction with a locking device for holding the carriages to the bridge after they have been positioned.

It would be advantageous to have an alternative positioning system, such as a rack and pinion type arrangement, which is simpler to construct and operate, and which is less expensive than the above-mentioned systems. However, conventional rack and pinion systems are limited in that the pinion can only be positioned along the rack in increments corresponding to the spacing between adjacent teeth of the rack. For example, if the spacing of the rack teeth is ¼ inch (0.64 cm.), then the pinion must be moved along the rack in ¼ inch increments, thereby limiting the resolution of the positioning system to ¼ inch.

It would be advantageous to have a rack and pinion type positioning system wherein the position of the pinion is not solely a function of the increment or spacing between the adjacent teeth of the associated rack. It would be further advantageous to provide an alternative mechanical positioning system which has greater positioning resolution or precision than conventional rack and pinion arrangements or the like.

SUMMARY OF THE INVENTION

The present invention encompasses a positioning apparatus including a first member having a first engaging means, and a second member having a plurality of second engaging means, wherein the first member and the second member are movable relative to each other between a first position wherein the first and second members are disengaged, and a second position wherein a first selected one of the second engaging means is engaged with the first engaging means. The second member is displaceable a first distance by disengaging the first selected one of the second engaging means, and engaging a second selected one of the second engaging means adjacent to the first selected one with the first engaging means. The second member is displaceable a second distance different from the first distance by disengaging the first selected one of the second engaging means, and engaging of third selected one of the second engaging means adjacent to the first selected one with the first engaging means.

DESCRIPTION OF THE INVENTION

Figure 1:
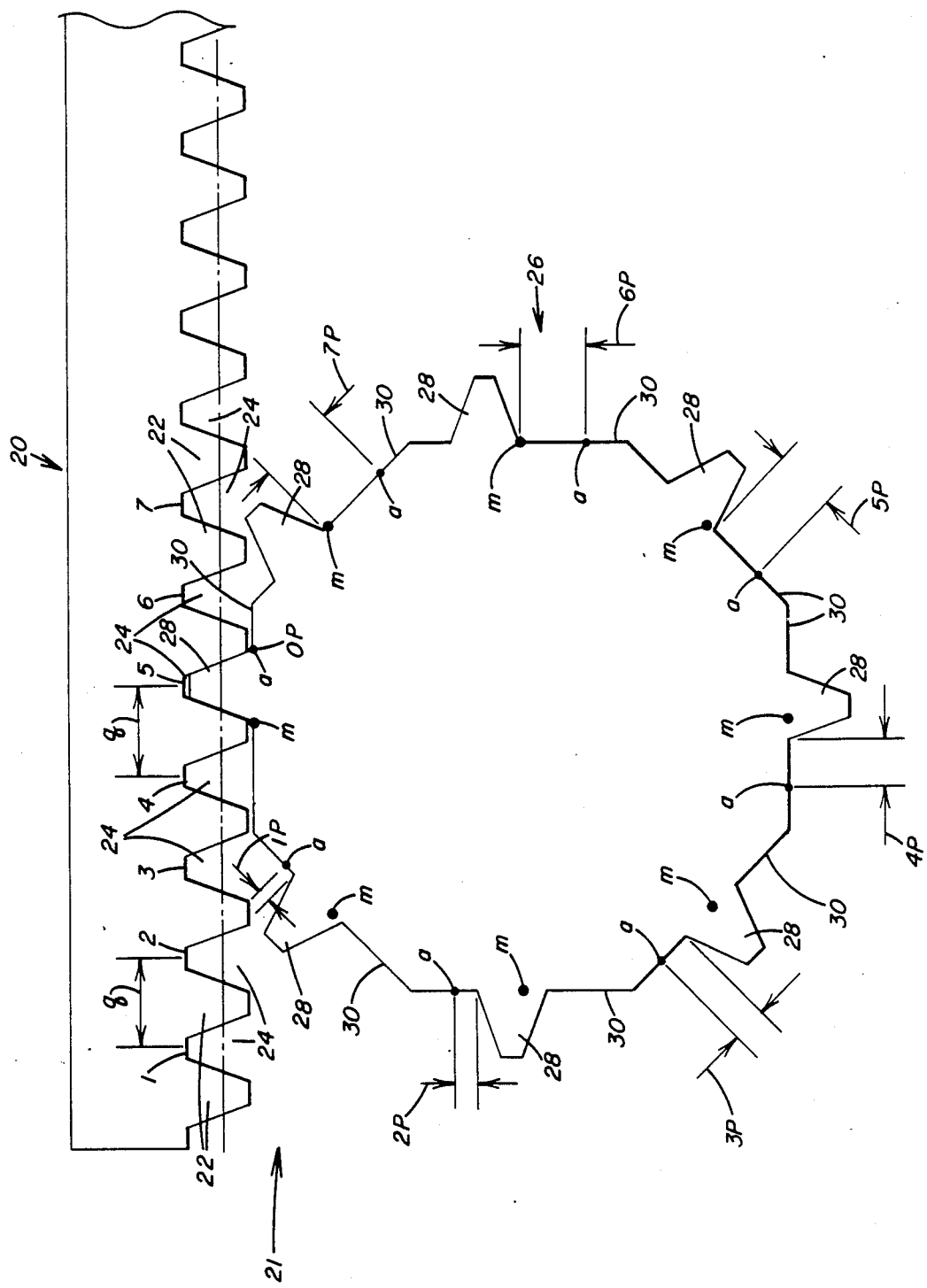
FIG. 1 is a plan view of a positioning apparatus incorporating features of the present invention.
Figure 2:
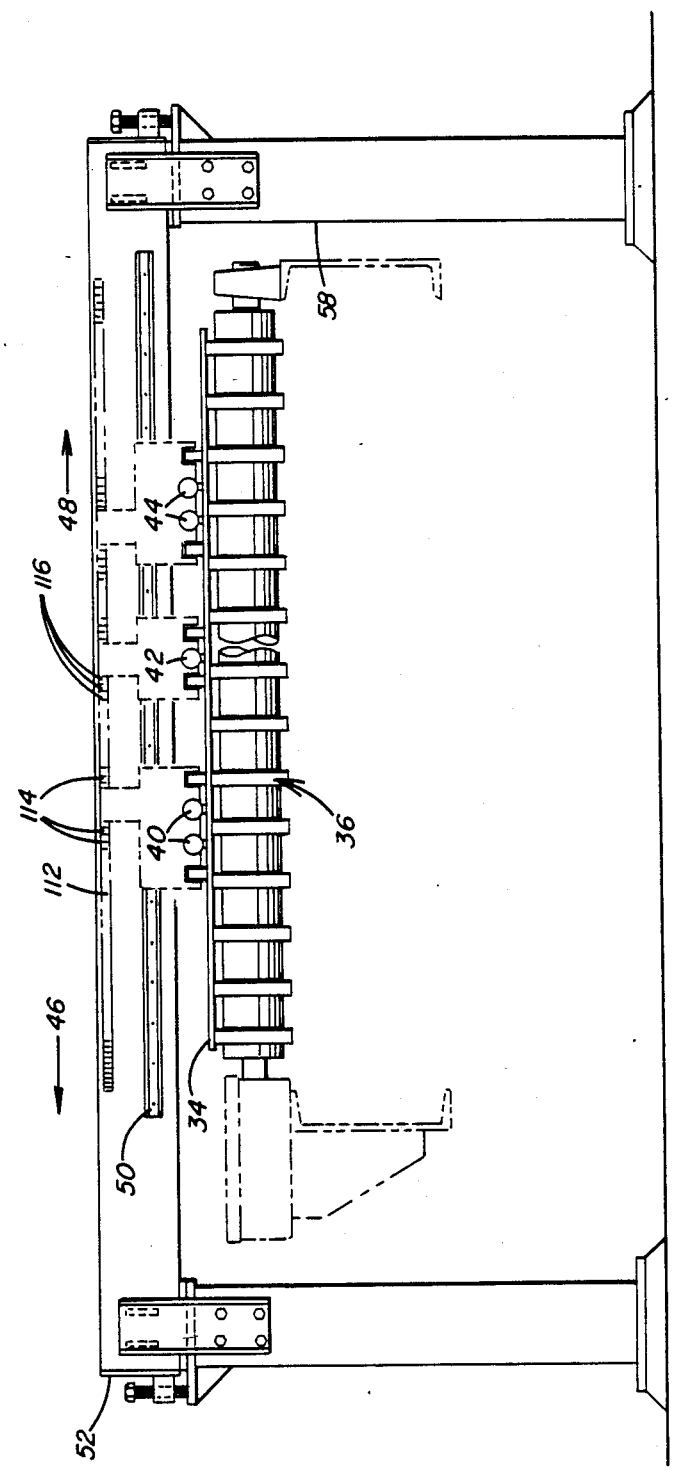
FIG. 2 is a diagrammatic, frontal, elevational view of a scoring station for scoring a glass sheet or ribbon, having a scoring device positioning apparatus incorporating features of this invention.
Figure 3:
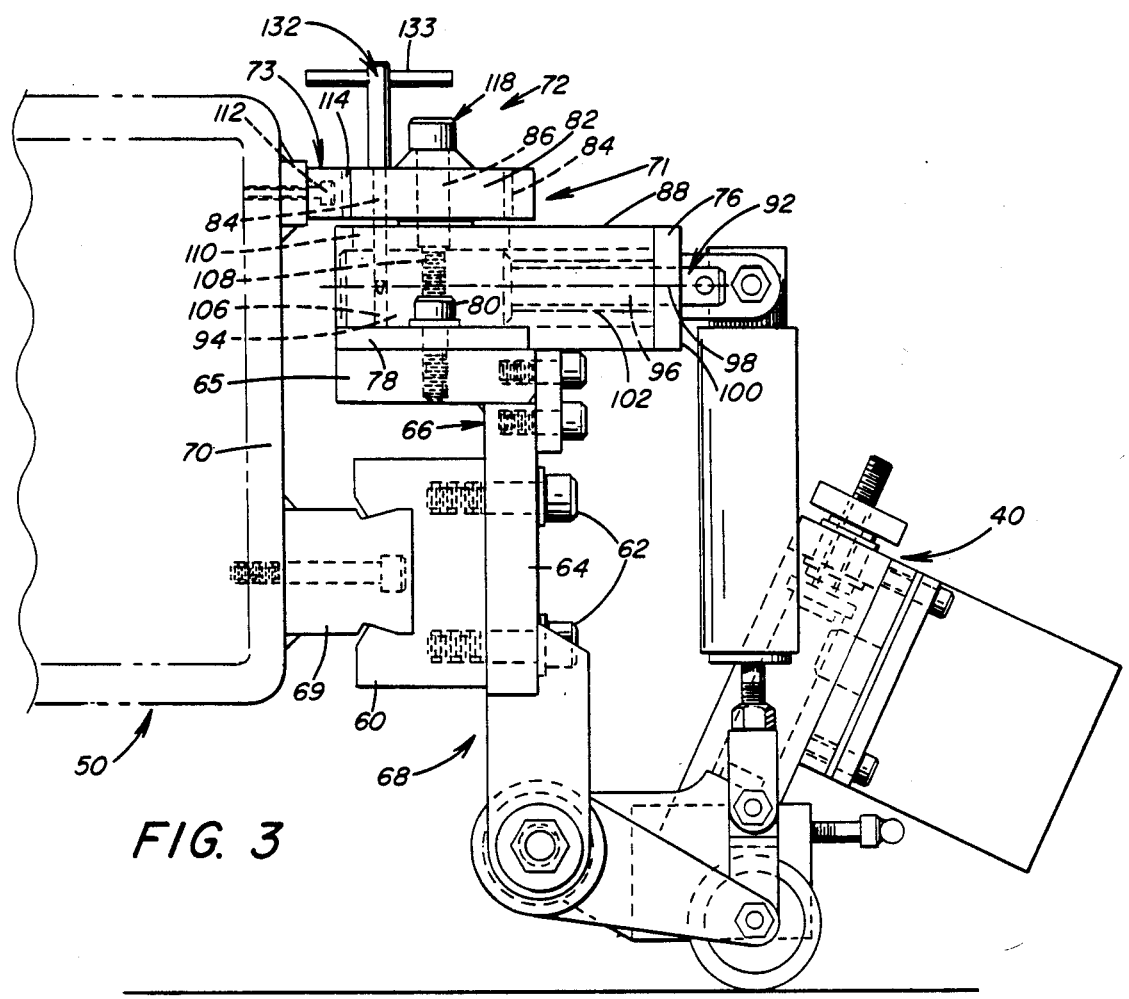
FIG. 3 is a partially sectional, side, elevational view of the positioning apparatus of FIG. 2.
Figure 4:
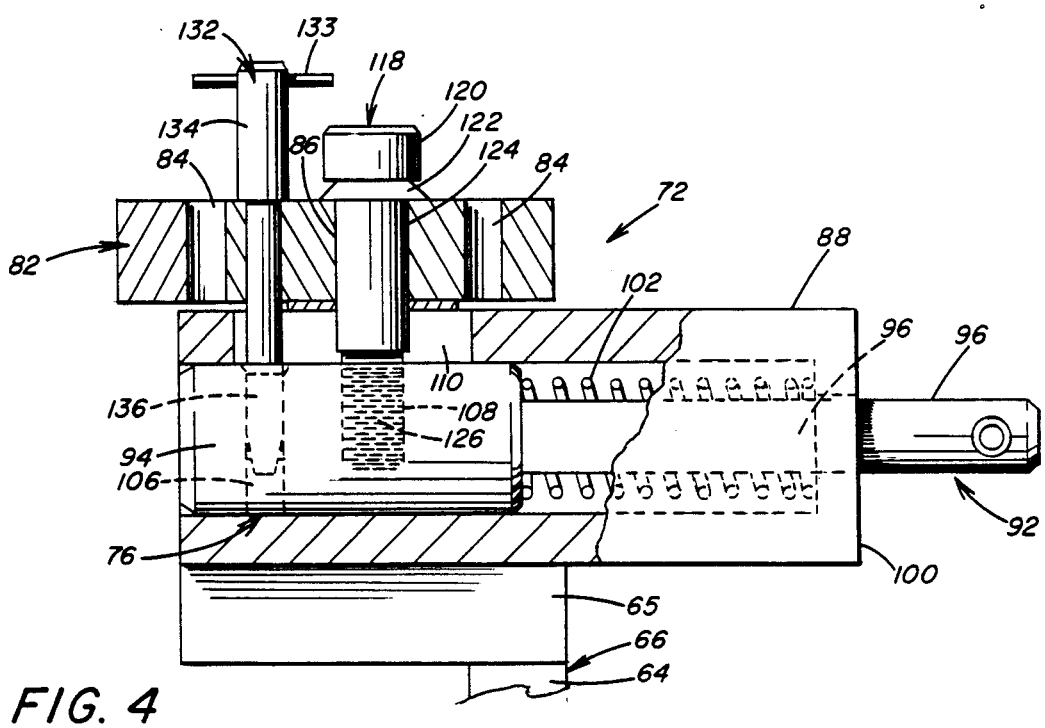
FIG. 4 is an isolation, transverse, partially cross-sectional view of the first part of the positioning apparatus of FIGS. 2 and 3.
Figure 5:
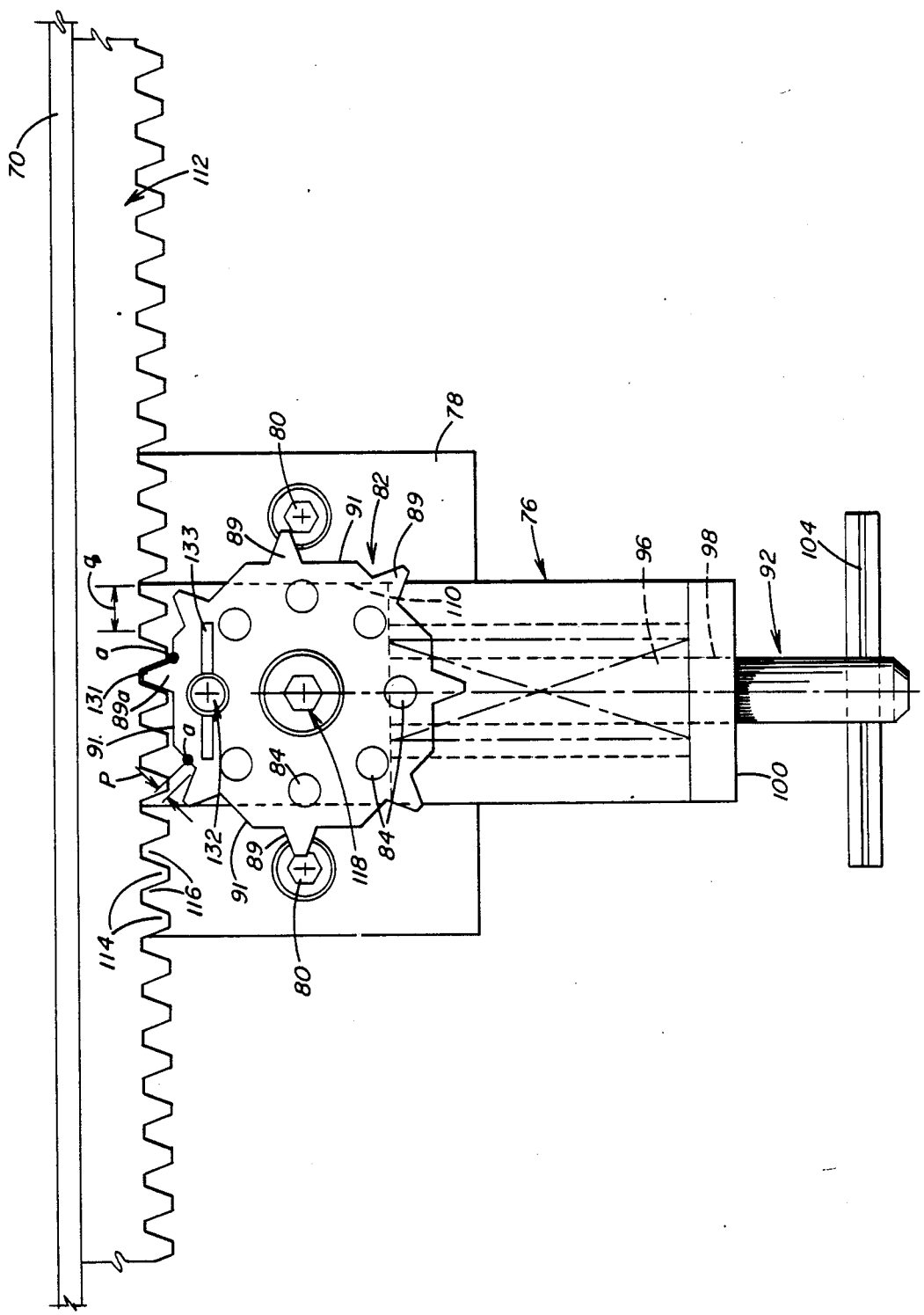
FIG. 5 is an isolation, partially sectional, plan view of the positioning apparatus of FIGS. 2 and 3.

With reference to FIG. 1, there can be seen a typical embodiment of the indexing or positioning apparatus 21 of the present invention, wherein it is shown to include an elongated member or rack 20 having a plurality of spaced apart teeth 22 defining a plurality of spaced apart detents or grooves 24, and a spur gear or pinion 26 having a plurality of spaced apart teeth 28 adapted to intermeshingly engage or mate with the detents 24. The rack 20 is shown to be linearly elongated, although this is not limiting to the invention. For example, the rack may be arcuate, curvilinear, circular, square, or in general, may be of any convenient size, shape, style, or configuration. The pinion 26 is shown to include a generally octagonal, equilateral disc-like member having a tooth 28 disposed on each planar side 30 thereof. However, the shape, size, style, and/or configuration of the pinion 26 is not limiting to the invention. For example, the pinion 26 may be rectangular, cylindrical, triangular, etc. and the teeth 28 may be disposed in any configuration which facilitates displacement, e.g. linear displacement, of the pinion 26 when a one of the pinion teeth 28 is disengaged and a different one of the pinion teeth 28 engaged with the same one of the rack detents 24. Further, the type of engaging means employed in conjunction with the rack 20 and the pinion 26 is not limiting to the invention. For example, the pinion 26 may include a plurality of spaced apart male engaging means, and the rack 20 may include one or more female engaging means adapted to cooperatively engage or mate with the male engaging means; or, the pinion 26 may include a plurality of spaced apart female engaging means, and the rack 20 may include one or more male engaging means adapted to cooperatively engage or mate with the female engaging means. In either instance, the male engaging means may, for example, include a post, pin, tab, tooth, or the like, and the female engaging means may include a hole, recess, detent, groove, or the like.

Referring still to FIG. 1, the pinion 26 is movable towards and away from the rack 20 between a first position wherein a pinion tooth 28 is engaged with a rack detent 24 and a second position wherein the rack 20 and pinion 26 are disengaged. The pinion 26 is preferably rotatable about its central axis when it is in the second position, i.e., disengaged from the rack 20, to facilitate alignment of any selected one of the pinion teeth 26 with a rack detent 24. The linear position of the pinion 26 can be changed or indexed by disengaging the rack 20 and pinion 26, and then rotating the pinion 26 to align a different one of the pinion teeth 28 with the same rack detent 24. In the embodiment shown in FIG. 1, the pinion can be linearly displaced/moved, in this manner, into eight different positions, which are conveniently numbered sequentially from zero to seven for purposes of the ensuing discussion. The zero or home/reference position corresponds to the linear position of the pinion 26 when the pinion tooth 28 which is disposed farthest from the endmost or number 1 rack detent 24 when in the engaged position, is engaged with a rack detent 24. The distance by which each of the successive adjacent ónes of the pinion teeth 28 is offset from the reference point a of its associated side 30 can be described as xp, wherein "x" represents the numerical value of the position associated with each tooth 28, and p represents the equal, greater increment by which the teeth 28 are progressively offset from the reference point of their associated side 30. In the preferred embodiment depicted in FIG. 1, since the sides 30 are of equal length, the reference point a of each of the sides 30 is disposed the same distance from the midpoint m of its associated side 30. The linear position of the pinion 26 can also be defined as the xp value of the pinion tooth 28 associated with any given position. For example, the linear position of the pinion 26 when it is in its sixth position is 6p, which means that when the pinion tooth 28 associated with the zero position is disengaged from a one of the rack detents 24 and the pinion tooth 28 associated with the sixth position then engaged with the same one of the rack detents 24, the absolute difference in the linear position of the pinion 26 will be 6p. Further, the pinion 26 is preferably linearly displaceable in either direction, represented by the arrows 32, 34, adjacently along the rack 20, to facilitate alignment of any selected one of the pinion teeth 28 with any selected one of the rack detents 24. In this manner, the linear position of the pinion 26 may be adjusted or indexed by disengaging the rack 20 and pinion 26, and then moving the pinion 26 adjacently along the rack 20 and engaging a one of the pinion teeth 28 with a different one of the rack detents 24. If, for example, the rack detents 24 are equally spaced apart by a distance q, as shown in FIG. 1, then the pinion may be linearly displaced by a distance nq by disengaging a pinion tooth 28 with the engaged rack detent 24 and then engaging the same pinion tooth 28 with a different one of the rack detents 24. The "n" in the formula nq represents the difference between the numerical values assigned to the subsequently engaged rack detent 24 and the originally engaged rack detent 24. For example, with the rack detents 24 sequentially numbered one to seven for purposes of this discussion, if a particular pinion tooth 28 (e.g. the one corresponding to position 5) is disengaged from the engaged rack detent 24 (e.g. number 5) and then the same pinion tooth 28 engaged with a different rack detent 24 (e.g. number 7), then the pinion 26 will be linearly displaced by the distance 2q, since n=7 (the number of the subsequently engaged detent 24)−5 (the number of the originally engaged detent 24)=2. It should be understood that the rack detents 24 need not be equally spaced, and in fact, there need be only one rack detent 24 for purposes of this invention. Further, the greatest distance xp by which any one of the pinion teeth 28 is offset from the reference point a of its associated side 30, which in the illustrative embodiment shown in FIG. 1 is 7p, is preferably less than the spacing q between adjacent ones of the rack detents 24, (i.e. 7p<q) Yet further, the pinion 26 can be linearly displaced by a distance xp+nq, rather than just xp or nq. The following Table I delineates the linear displacement distance of the pinion 26 with every possible rack and pinion engagement position of the indexing or positioning apparatus 21 of the present invention depicted in FIG. 1, when $q = \frac{1}{4}$ inch (0.64 cm) and p=1/32 inch (0.033 cm.).

TABLE I

| Pinion Linear Displacement Distance (in inches) | Pinion Position | Rack Detent No. |
| --- | --- | --- |
| 0 | 0 | 1 |
| 1/32 | 1 | 1 |
| 1/16 | 2 | 1 |
| 3/32 | 3 | 1 |
| 1/8 | 4 | 1 |
| 5/32 | 5 | 1 |
| 3/16 | 6 | 1 |
| 7/32 | 7 | 1 |
| 1/4 | 0 | 2 |
| 9/32 | 1 | 2 |
| 5/16 | 2 | 2 |
| 11/32 | 3 | 2 |
| 3/8 | 4 | 2 |
| 13/32 | 5 | 2 |
| 7/16 | 6 | 2 |
| 15/32 | 7 | 2 |
| 1/2 | 0 | 3 |
| 17/32 | 1 | 3 |
| 9/16 | 2 | 3 |
| 19/32 | 3 | 3 |
| 5/8 | 4 | 3 |
| 21/32 | 5 | 3 |
| 11/16 | 6 | 3 |
| 23/32 | 7 | 3 |
| 3/4 | 0 | 4 |
| 25/32 | 1 | 4 |
| 13/16 | 2 | 4 |
| 27/32 | 3 | 4 |
| 7/8 | 4 | 4 |
| 29/32 | 5 | 4 |
| 15/16 | 6 | 4 |
| 31/32 | 7 | 4 |
| 1 | 0 | 5 |
| 1 1/32 | 1 | 5 |
| 1 1/16 | 2 | 5 |
| 1 3/32 | 3 | 5 |
| 1 1/8 | 4 | 5 |
| 1 5/32 | 5 | 5 |
| 1 3/16 | 6 | 5 |
| 1 7/32 | 7 | 5 |
| 1 1/4 | 0 | 6 |
| 1 9/32 | 1 | 6 |
| 1 5/16 | 2 | 6 |
| 1 11/32 | 3 | 6 |
| 1 3/8 | 4 | 6 |
| 1 13/32 | 5 | 6 |
| 1 7/16 | 6 | 6 |
| 1 15/32 | 7 | 6 |
| 1 1/2 | 0 | 7 |
| 1 17/32 | 1 | 7 |
| 1 9/16 | 2 | 7 |
| 1 19/32 | 3 | 7 |
| 1 5/8 | 4 | 7 |
| 1 21/32 | 5 | 7 |
| 1 11/16 | 6 | 7 |
| 1 23/32 | 7 | 7 |

[1] as measured from the home position (i.e. pinion position = 0 and rack detent No. = 1)

Alternatively, one of the teeth 28 may be disposed at the midpoint m of its associated side 30 and the remainder of the teeth 28 may be sequentially offset by a greater increment from the midpoint m of their associated sides 30. The greater increment by which the pinion teeth 28 are increasingly spaced may conveniently be equal. Alternatively, the pinion may be a circular member having a plurality of unequally spaced apart teeth disposed about the periphery thereof. In general, the teeth 28 may be disposed in any configuration which facilitates displacement, e.g. linear displacement, of the pinion 26 when a one of the pinion teeth 28 is disengaged and a different one of the pinion teeth 28 then engaged with the same one of the rack detents 24.

Description of an Actual Application of the Present Invention

Referring now to FIGS. 2-5, there can be seen an actual embodiment of the present invention, shown in an actual application context, wherein a glass sheet or glass ribbon 34 is advanced by a conveyor 36 past a plurality of scoring devices 40, 42, and 44 each of which is adapted to impose a score line (not shown) in the glass sheet 34 in any convenient manner, e.g. such as taught.in U.S. Pat. No. 4,137,803 issued to the present applicant and assigned to the assignee of the present invention, which teachings are herein incorporated by reference. The scoring devices 40, 42, and 44 are substantially identical in construction to the one taught in the above-referenced application. The following discussion will be directed to the positioning apparatus of the present invention as it relates to a one of the scoring devices, namely, the scoring device 40, with the understanding that the discussion is equally applicable to the other scoring devices 42, 44.

The scoring device 40 is adapted for linear movement in the direction of either of the arrows 46, 48 along a transverse structural member 50 which extends transversely over the conveyor 36. The opposite ends 52, 54 of the transverse structural member 50 (sometimes referred to as a "bridge") are conveniently attached to upright support members 56, 58, respectively, of the conveyor 36.

A bearing block 60 is mounted by means of bolts 62 or the like to the upright segment 64 of generally L-shaped plate member 66 of carrier assembly 68 which carries the scoring device 40. The bearing block 60 is adapted to travel along an elongated trackway member 69 mounted to a lower portion of upright face wall 70 of the transverse structural member 50, to thereby conjunctively move the carrier assembly 68 and the scoring device 40 along the linear movement path 46 or 48. A first part 71 of the positioning apparatus 72 of the actual embodiment of the present invention is mounted to horizontal segment 65 of the L-shaped plate member 66. A second part 73 of the positioning apparatus 72 is mounted to an upper portion of the upright face wall 70 of the transverse structural member 50.

The first part 71 includes a plunger housing 76 of generally rectangular transverse cross-section, mounted by means of mounting bracket 78 and bolts 80 to the upper surface of the horizontal segment 65 of the plate member 66. A spur gear or pinion 82 identical in construction to the spur gear or pinion 26 shown in FIG. 1 and described in the "Description of the Invention", infra, is rotatably mounted to the plunger housing 76. However, the pinion 82 further includes a plurality of equally spaced apart locating holes 84 (i.e. at 45° apart), and a center bore 86 disposed through the central axis of the pinion 82. The upper wall 88 of the plunger housing 76 is provided with a cut-out portion 110. A plunger 92 is mounted for reciprocal movement within the plunger housing 76. The plunger 92 includes a generally cylindrical plunger head portion 94 and a shaft portion 96 which extends outwardly through a plunger bore 98 provided through an upright face wall 100 of the plunger housing 76. A compression spring 102 is mounted within the plunger housing 76 between the plunger head portion 94 and the inner surface of the upright face wall 100 of the plunger housing 76. The outwardly projecting portion of the plunger shaft portion 96 is provided with a transverse handle bar 104. The plunger head portion 94 is provided with a longitudinal locator bore 106 and a longitudinal, threaded bore 108 axially aligned with the center bore 86. Both the locator bore 106 and the bore 108 are aligned with the cutout portion 110 of the plunger housing 76.

The second part 73 of the positioning apparatus 74 comprises an elongated member or rack 112 having a plurality of equally spaced apart teeth 114 defining a plurality of equally spaced apart detents or grooves 116. The actual spacing of the grooves 116 is about $\frac{1}{4}$ inch (0.64 cm.). The rack 112 is welded or otherwise securely mounted to an upper portion of the upright face-wall 70 of the transverse structural member 50.

A downwardly extending shoulder screw 118 is inserted through the center bore 86 of the pinion 82. The shoulder screw 118 includes a socket head portion 120 having a generally frusto-conical shoulder 122 abuttingly engaging the upper surface of the pinion 82; an intermediate sleeve portion 124 having a smooth outer, circumferential surface bearing against the walls defining the center bore 86, and a lower portion extending into the cutout portion 110 of the plunger housing 76; and, a lower, threaded shank portion 126 threadingly engaged with the longitudinal, threaded bore 108 of the plunger head portion 94. The pinion 82 is freely rotatable about the sleeve portion 124 when the pinion 82 is disengaged from the rack 112, in a manner as will hereinafter be clearly seen.

In operation, when it is desired to move the carrier assembly 68 and the scoring device 40 transversely over the glass sheet 34 along the linear movement path 46 or 48, the plunger 92 is pulled outwardly or away from the rack 112 by means of the handle bar 104, thereby also moving the pinion 82 commensurately away from the rack 112, by virtue of the interconnecting shoulder screw 118. The outward extension of the plunger 92 compresses the compression spring 102 against the inner surface of the upright face wall 100 of the plunger housing 76. The cutout portion 110 of the plunger housing 76 is dimensioned to allow the shoulder screw 118 to move back and forth therewithin a distance greater than the distance 130 between the tip face 131 of the engaged pinion tooth 89a and the associated side 91, thereby facilitating disengagement of the engaged pinion tooth 89a with the engaged rack detent 114. After the pinion 82 is disengaged from the rack 112, the pinion 82 may be rotated to align a different one of the pinion teeth 89 for engagement with a rack detent 114, which engagement is effected by way of releasing the handle bar 104 of the plunger 92, thereby allowing the plunger 92 to retract or move inwardly towards the rack 112 under the biasing influence of the compression spring 102, and simultaneously move the interconnected pinion 82 towards the rack 112. Additionally, or alternatively, the pinion 82 may be moved along the linear movement path 46 or 48 by disengaging the pinion 82 from the rack 112 and then moving the carrier assembly 68 and the scoring device 40 to which the pinion 82 is mounted therealong, by way of the bearing 60 riding along the trackway member 69, to align a pinion tooth 89 with a different rack detent 114, for engagement therewith. In the actual embodiment of the invention shown in FIGS. 2-4, the greater increment p by which each successive, adjacent pinion tooth 89 is offset from the reference point a of its associated side 91 is about 1/32 inch (0.033 cm.) and the equal spacing q between the rack detents 114 is about $\frac{1}{4}$ inch (0.64 cm.). Therefore, the scoring device 40 may be linearly indexed in increments of 1/32 inch or ¼ inch or combinations thereof as can be seen in Table I, by way of commensurate linear movement of the pinion 82. After the pinion 82 and the associated scoring device 40 have been linearly positioned at a predetermined or desired location along the linear movement path 46 or 48, a locating pin 132 having a handle bar 133 is inserted through the locating hole 84 associated with the pinion tooth 89 engaged with the rack detent 114 at that predetermined position. The locating pin 132 includes a head portion 134 abuttingly engaging the upper surface of the pinion 82, and a shank portion 136 having a smooth, circumferential surface bearing against the walls forming the locating hole 84, and extending downwardly through the cutout portion 110 of the plunger housing 76 and into the locator bore 86 of the plunger head portion 94, to thereby lockingly secure the pinion 82 and the associated scoring device 40 in the selected position over the glass sheet 34.

Although the present invention has been described in some detail, various modifications and/or variations of the basic inventive concepts herein taught which may appear to those skilled in the pertinent art, are also encompassed within the spirit and scope of the present invention, which should be interpreted solely on the basis of the following claims.

What is claimed is:

1. An apparatus for displacing a device, comprising:
   a first engaging means;
   a member having a plurality of second engaging means;
   means for moving said first engaging means and said member relative to one another into a first position with said first and second engaging means spaced from one another and with first one of said said second engaging means in an engaging position and into a second position with said first one of said second engaging means in engagement with said first engaging means;
   means for displacing said first engaging means and member relative to one another when said first engaging means and said second engaging means are in the first position (1) to move a second one of said second engaging means in the engaging position wherein said first engaging means and said member are displaced a first distance relative to one another when said second engaging means and said first engaging means are in the second position and said second one of said second engaging means engages said first engaging means and (2) to move a third one of said second engaging means into the engaging position wherein said first engaging means and said member are displaced a second distance relative to one another when said second engaging means and said first engaging means are in the second position and said third one of said second engaging means engages said first engaging means, wherein further, the first distance is different than the second distance; and
   means for connecting the device to move with said first engaging means or said member.

2. The apparatus as set forth in claim 1, wherein said first engaging means includes an elongated member having a plurality of spaced apart engaging means, and wherein further, said displacing means moves said second engaging means adjacently along said elongated member when said first engaging means and said member are moved relative to one another by said displacing means.

3. The apparatus as set forth in claim 2, wherein said member comprises a member having a plurality of flat peripheral sides each having a midpoint, selected ones of said sides having a one of said plurality of second engaging means thereon, and said second engaging means mounted on said sides are each disposed a different distance from the midpoint of its respective side.

4. The apparatus as set forth in claim 3, wherein said sides are planar and equilateral.

5. The apparatus as set forth in claim 1, wherein said member comprises a disc-like member having said plurality of second engaging means disposed about the periphery thereof in unequally spaced relation to each other.

6. The apparatus as set forth in claim 1, wherein said second engaging means comprises a plurality of male engaging means and said first engaging means each comprises a female engaging means.

7. The apparatus as set forth in claim 1, wherein asid second engaging means comprises a plurality of female engaging means and said first engaging means comprises a male engaging means.

8. The apparatus as set forth in claim 1 further including a work surface and means for mounting said first engaging means and said member at least partially over said work surface wherein the device moves with said first engaging means or said member as said displacing means moves said first engaging means and said member relative to one another.

9. The apparatus as set forth in claim 8, wherein the device is linearly displaced the first and second distances across the work surface when said second engaging means displaced relative to said first engaging means said first and second distances, respectively.

10. The apparatus as set froth in claim 9, wherein said device comprises means for socring a piece of glass.

11. The apparatus as et forth in claim 1 wherein
    said first engaging measns includes rack having a plurality of detents;
    said member is pinion having planar equlateral sides and said second engaging means is a tooth mounted on each side spaced a different distance from midpoint of said side;
    a spanning member;
    means mounting said rack on said spanning member;
    said moving means moves said pinion away from said rack into the first position and toward said rack into the second position; and
    the device includes means for scoring glass.

* * * * *

UNITED STATES PATENT AND TRADEMARK OFFICE
CERTIFICATE OF CORRECTION

PATENT NO. : 4,671,155

DATED : June 9, 1987

INVENTOR(S) : John A. Goldinger

It is certified that error appears in the above-identified patent and that said Letters Patent is hereby corrected as shown below:

Claim 10 (column 8, line 47), "socring" should be "scoring".

Claim 11 (column 8, line 49), "measns" should be "means".

Signed and Sealed this

Tenth Day of May, 1988

*Attest:*

DONALD J. QUIGG

*Attesting Officer*      *Commissioner of Patents and Trademarks*